April 28, 1942.  J. F. SLADKY  2,281,117
ACCELERATOR PEDAL
Filed Feb. 15, 1940
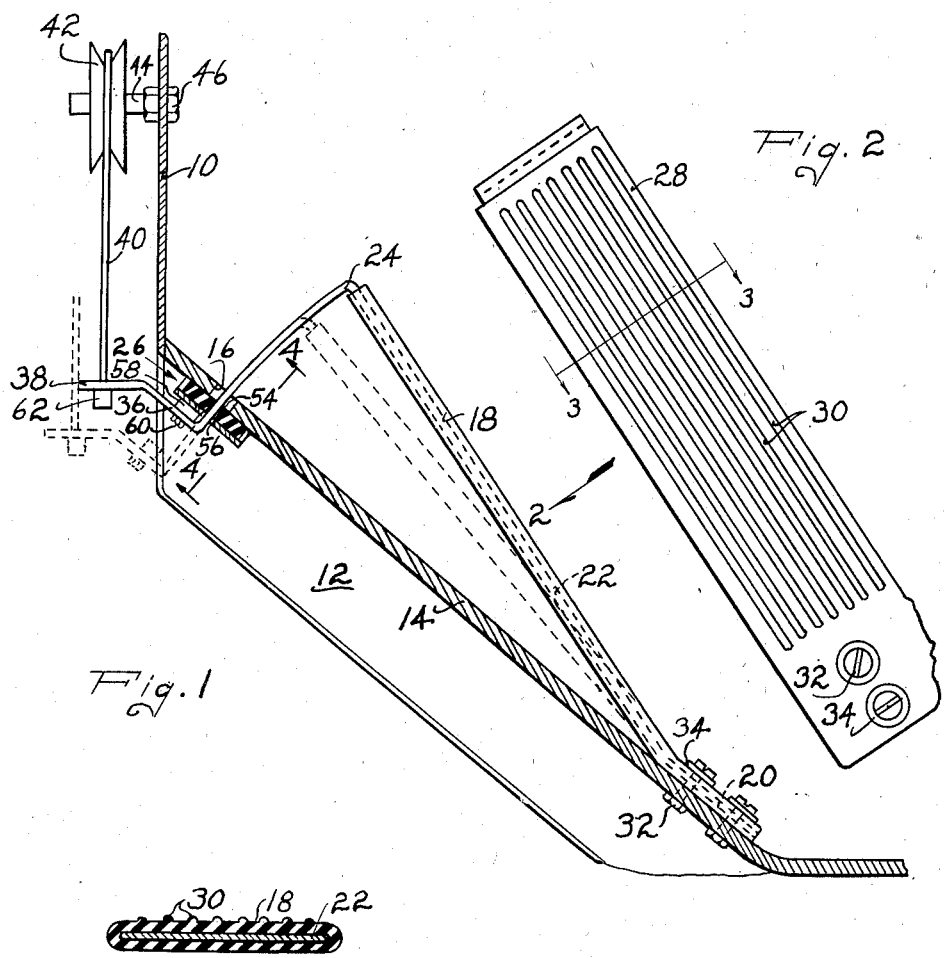
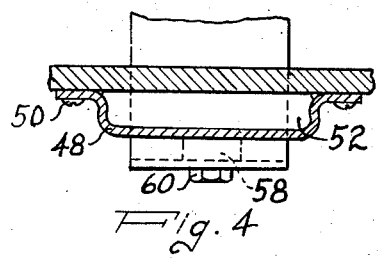
INVENTOR.
JOSEPH F. SLADKY.
BY Carl J. Barbee
his ATTORNEY.

Patented Apr. 28, 1942

2,281,117

UNITED STATES PATENT OFFICE 2,281,117

ACCELERATOR PEDAL

Joseph F. Sladky, Racine, Wis., assignor to Nash-Kelvinator Corporation, Kenosha, Wis., a corporation of Maryland Application February 15, 1940, Serial No. 319,041

4 Claims. (Cl. 74—513)

This invention relates to accelerator pedals and has particular reference to a flexible accelerator pedal for controlling the throttle of an automobile.

It is an object of this invention to provide an accelerator pedal which is cheaper to construct and install than accelerator pedals known heretofore.

It is another object of this invention to provide an accelerator pedal which is self-restoring to its original position.

It is another object of this invention to provide an accelerator pedal of spring material which requires no outside force to return it to its original position.

It is another object of this invention to provide an accelerator pedal which may be easily passed through the floor board of an automobile.

It is another object of this invention to provide novel means for sealing the opening through which an accelerator pedal passes through the floor board of an automobile.

Other objects and advantages of this invention will be apparent from a consideration of the following specification and the attached drawing of which there is one sheet and in which Figure 1 represents a vertical longitudinal section through a portion of the dash panel and floor board of an automobile illustrating my accelerator pedal in normal position;

Figure 2 represents a plan view of my accelerator pedal as viewed from the direction indicated by the arrow 2 in Figure 1;

Figure 3 represents a section taken along the line 3—3 of Figure 2 and looking in the direction of the arrows;

Figure 4 represents a section taken along the line 4—4 of Figure 1 and looking in the direction of the arrows.

In the drawing I have illustrated a dash panel 10 of an automobile body which is connected to the floor board 12 of the automobile in any suitable manner known to the art today. The floor board 12 may be raised near the center of the car as indicated at 14 to clear the clutch and transmission housings of the automobile. The floor board 14 is provided with a slot 16 through which my accelerator pedal is arranged to pass.

My pedal 18 is formed of a strip of suitable material such as spring steel having a flat end portion 20 and a bent up foot portion 22, the upper end of which is bent sharply down at 24 along an arc having a radius approximately equal to the length of the foot portion 22. The arc-shaped portion of the pedal is as long as the amount of travel which the pedal is expected to move through plus a sufficient length to pass the same through the floor board 14 and a sealing means generally indicated at 26 which will be more particularly described later. It will be noted that the bent down portion 24 is approximately normal to the floor board 14 so that the slot 16 need not be widened to pass the bent down portion 24.

Around the lower end portion 20 and the foot portion 22 of the pedal I have provided a sleeve 28 of flexible material such as rubber. This sleeve may be easily pushed onto the pedal over the lower end 20 and is preferably provided with some anti-slip corrugations such as the ribs 30. The lower end portion 20 of the pedal is fastened to the floor board 14 by some suitable means such as the bolts 32 which are passed through holes provided in the floor board, pedal, and sleeve. The bolts 32 may be provided with washers 34 between the heads of the bolts and the rubber sleeve to increase the area in contact with the rubber sleeve and prevent undue wear. Besides providing anti-slip properties, the sleeve 18 prevents the transmission of vibration between the pedal and the floor boards.

The lower end of the arc-shaped portion 24 of the pedal is bent up as at 36 to extend approximately parallel to the floor board 14 when the pedal is in raised position. At a point where the portion 36 extends beyond the dash panel 10, the pedal is bent out in a generally horizontal portion 38 which is apertured to receive the end of a control cable 40 for operating the throttle of the automobile (not shown). The cable 40 passes upwardly and over a pulley 42 which is journaled on a shaft 44 fixed to the dash panel 10 by means of the bolts 46. The cable 40 may run directly to the throttle control of the carburetor or may operate a suitable system of levers for operating the throttle such as that disclosed in the application of George Russell Noble, Serial No. ———.

It should be apparent that with the lower end portion 20 firmly fixed to the floor board 14 by the bolts 32, the foot portion 18 may be pressed to the floor board due to the flexible character of the pedal. Pressing down on the foot portion 18 causes the arcuate end portion 24 to pass through the aperture 16 and move the end portion 38 generally downward. This operates to draw the cable 40 down to actuate the throttle mechanism. When the foot portion 18 is released, the natural spring in the pedal 18 between the end portion 20 and the foot portion 18 will return the pedal to its normal position, thus releasing the cable 40. I have assumed that the throttle mechanism will be provided with a suitable spring return to close the throttle and return the cable 40 to its original position.

Positioned under the slot 16 is a U-shaped bracket 48 which is held to the underside of the floor board 14 by means of screws 50 as is most clearly seen in Figure 4. The bracket 48 serves to hold a block 52 of deformable material such as soft or sponge rubber against the underside of the floor board 14 and overlapping the slot 16 on all sides. The block of rubber 52 is preferably thicker than the depth of the U-shaped bracket 48 so that the rubber will be compressed as the bracket is fastened down to the floor board. The block of rubber 52 may be sloted as at 54 by making a single cut therethrough so that it may be slipped over the end portions 38 and 36 of the pedal into position on the arcuate portion 24 of the pedal. The U-shaped bracket 48 is provided with a slot 56 of sufficient size to pass the arcuate portion 24 of the foot pedal. Thus when the bracket 48 is drawn down against the floor board 14, it compresses the rubber block 52 around the slot 16 and the arcuate portion 24 of the pedal to seal the openings around the pedal and prevent cold air and dirt from entering the car. The rubber will not slide out of the bracket 48 because the pedal is passed through the slot 54.

On the upper side of the portion 36 of the pedal I have provided a block 58 of relatively soft material such as rubber which acts as an abutment between the bracket 48 and the portion 36 of the pedal to limit the upward movement of the foot pedal. Block 58 may be retained in place by some suitable means such as the bolt 60.

The cable 40 may be attached to the end portion 38 of the pedal by passing the cable through a hole in the end of the pedal and then fastening the lug 62 over the end of the cable in any suitable manner.

It should be apparent that my accelerator pedal may be easily installed as follows: With the floor board 14 provided with the slot 16 and holes for the bolts 32, the sleeve 18 may be slid over the end portion 20 and the foot portion 22 and the upper end portion 38 and 36 may be slipped through the slot 16 in the order mentioned. Then the lower end portion 20 of the pedal may be fastened in place by the bolts 32. The rubber block 52 and the bracket 48 may be slid over the upper end portions 38 and 36 of the pedal and the bracket fastened in place by the screws 50, after which the abutment 58 may be fixed in place and the cable 40 attached to the end portion 38.

While I have described my invention in some detail, I intend this description to be an example only and not limiting my invention to which I make the following claims.

I claim:

1. In an automobile having a floor board, an accelerator pedal having a continuous flexible member fixed at one end to said floor board, a deformable sleeve covering a portion of said flexible member, another portion of said flexible member extending through said floor board and arranged to be connected to throttle operating mechanism.

2. In an automobile having a floor board, an accelerator pedal having a continuous elastic member fixed at one end to said floor board, a rubber sleeve covering a portion of said elastic member including that portion fixed to said floor board, another portion of said elastic member extending through said floor board and arranged to be connected to a cable for operating throttle mechanism.

3. In an automobile having a floor board defining a slot, an accelerator pedal of flexible strip material fastened at its lower end to said floor board, a portion of said strip positioned approximately normal to said floor board and extending through said slot.

4. An accelerator pedal made of a continuous strip having a base portion, a foot portion permanently bent out of the plane of said base portion, a portion at the other end of said foot portion bent down across the plane of said base portion, a portion forming an abutment, an end portion adapted to be connected to a throttle control and means for rigidly fastening said base portion to a floor board.

JOSEPH F. SLADKY.